(12) United States Patent  (10) Patent No.: US 11,011,076 B2
Seo  (45) Date of Patent: May 18, 2021

(54) DISPLAY MODULE FOR VISUALLY IMPAIRED PERSONS

(71) Applicant: SENSEE, INC., Daejeon (KR)

(72) Inventor: In Sik Seo, Daejeon (KR)

(73) Assignee: SENSEE, INC., Daejeon (KR)

( * ) Notice: Subject to any disclaimer, the term of this patent is extended or adjusted under 35 U.S.C. 154(b) by 366 days.

(21) Appl. No.: 16/171,815

(22) Filed: Oct. 26, 2018

(65) Prior Publication Data

US 2020/0105163 A1 Apr. 2, 2020

(30) Foreign Application Priority Data

Oct. 1, 2018 (KR) .......................... 10-2018-0117189

(51) Int. Cl.
*G09B 21/00* (2006.01)
*G06F 3/01* (2006.01)

(52) U.S. Cl.
CPC ............ *G09B 21/004* (2013.01); *G06F 3/016* (2013.01)

(58) Field of Classification Search
CPC .... G09B 21/00; G09B 21/002; G09B 21/003; G09B 21/004; G09B 21/02
See application file for complete search history.

(56) References Cited

U.S. PATENT DOCUMENTS

| | | | | |
|---|---|---|---|---|
| 3,659,354 A | * | 5/1972 | Sutherland | G09B 21/003 434/113 |
| 4,191,945 A | * | 3/1980 | Hannen | G09B 21/004 340/407.1 |
| 4,871,992 A | * | 10/1989 | Petersen | G09B 21/003 340/407.1 |
| 5,449,292 A | * | 9/1995 | Tani | G09B 21/004 340/4.12 |
| 6,109,922 A | * | 8/2000 | Litschel | G09B 21/004 340/4.12 |
| 6,417,821 B1 | * | 7/2002 | Becker | G09B 21/003 340/407.1 |
| 6,705,868 B1 | * | 3/2004 | Schleppenbach | G09B 21/004 434/112 |
| 6,734,785 B2 | * | 5/2004 | Petersen | G09B 21/004 340/4.12 |
| 6,902,403 B1 | * | 6/2005 | Goldenberg | G09B 21/004 340/407.1 |
| 7,097,457 B2 | * | 8/2006 | Kajino | G09B 21/004 434/112 |
| 7,723,896 B2 | * | 5/2010 | Esashi | G09B 21/007 310/306 |

(Continued)

FOREIGN PATENT DOCUMENTS

KR 20-0403813 Y1 12/2005
KR 10-0734731 B1 7/2007

(Continued)

*Primary Examiner* — Kurt Fernstrom
(74) *Attorney, Agent, or Firm* — Birch, Stewart, Kolasch & Birch, LLP

(57) ABSTRACT

The present invention relates to a display module for visually impaired persons. More specifically, the present invention provides a display module for visually impaired persons which provides information such as braille, figures and images by using a plurality of protrusions which vertically moves so that a visually impaired person may obtain information through hand sensation.

10 Claims, 15 Drawing Sheets

(56) References Cited

U.S. PATENT DOCUMENTS

| | | | | |
|---|---|---|---|---|
| 8,690,576 B2* | 4/2014 | Murphy | ............... | G09B 21/004 |
| | | | | 434/114 |
| 8,740,618 B2* | 6/2014 | Shaw | ................... | G09B 21/004 |
| | | | | 434/113 |
| 9,336,688 B2* | 5/2016 | Karasin | ................. | G09B 21/004 |
| 10,733,907 B2* | 8/2020 | Chen | ......................... | G09F 9/37 |
| 10,891,875 B2* | 1/2021 | Cho | ..................... | G09B 21/005 |
| 2017/0193855 A1 | 7/2017 | Yang et al. | | |
| 2018/0190151 A1* | 7/2018 | Seo | ........................ | H01H 13/83 |
| 2018/0190152 A1 | 7/2018 | Seo | | |
| 2018/0204484 A1 | 7/2018 | Seo | | |

FOREIGN PATENT DOCUMENTS

| | | |
|---|---|---|
| KR | 10-1157928 B1 | 6/2012 |
| KR | 10-2014-0008823 A | 1/2014 |
| KR | 10-1438823 B1 | 9/2014 |
| KR | 20-0484372 Y | 8/2017 |
| KR | 10-1835235 B | 3/2018 |

* cited by examiner

DISPLAY MODULE FOR VISUALLY IMPAIRED PERSONS

CROSS REFERENCE TO RELATED APPLICATION

The present application claims priority to Korean Patent Application No. 10-2018-0117189, filed Oct. 1, 2018, the entire contents of which is incorporated herein for all purposes by this reference.

BACKGROUND OF THE INVENTION

Field of the Invention

The present invention relates to a display module for visually impaired persons. More particularly, the present invention relates to a display module for visually impaired persons which displays information such as braille words, figures, images by vertically moving a plurality of protrusions so that a visually impaired person may obtain information by sensing with his or her hand.

Description of the Related Art

Braille is a character symbol system that gives meaning to various dot patterns so that people can read and write through the tactile sensation. Generally, 3*2 or 4*2 dot patterns are widely for a braille character system, and the character system is constructed by varying the number and arrangement of dots.

Meanwhile, with the development of information and communication industries, the use of information and communication devices such as computers, mobile phones, personal digital assistants (PDAs), and portable multimedia players (PMPs) has become common nowadays. However, since a physically challenged person, for example, a visually impaired person cannot easily use information and communication devices, the visually impaired person feels alienated in the utilization of information and communication devices, which results in a digital divide. Therefore, it is required to eliminate economic and social inequality with regard to the access to information and communication technologies.

Various software and braille display devices have been developed so that the utilization rate of information of visually impaired persons is increased by using IT devices and the information gap is being reduced. Braille display devices are tactile devices that provide information to users through skin stimulation such as pressure, vibration, stimulation, etc. by being implemented in a cell with a plurality of pins.

For conventional braille display devices, various methods are used according to an actuator type. A solenoid based method, a piezoelectric based method, a dielectric elastomer based method are typical methods thereof.

In a solenoid based method, magnetic force is generated according to an electrical signal input to a coil, a plunger disposed inside the coil that generates the magnetic force is moved by receiving the force so that braille information is output.

In a piezoelectric based method, a piezoelectric element changes in a length thereof according to an electrical signal applied thereto, braille information is directly recognized by the piezoelectric element having changed in the length thereof.

In addition, a dielectric elastomer based method is a method of compressing a dielectric elastomer in a thickness direction and expanding the dielectric elastomer in a direction along a surface by using mutual attractive forces by forming electrodes on both sides of the elastomer having a high dielectric constant such as silicone or urethane.

However, when using the solenoid as a braille output element, it is difficult to integrate the solenoid in a small size, and when using the piezoelectric based method, a voltage difference between voltages applied to both ends of the piezoelectric to generate a change in a length thereof is considerably large so that control thereof is difficult. In addition, in the dielectric elastomer based method, in order to generate a volume change of the elastomer in a predetermined desired amount, a high voltage about 1~2 kV has to be applied thereto. In other words, it is difficult to provide a braille display device that includes a driving part or a controller for the same or both for outputting braille information, and the display device being a compact size, and providing excellent response factor.

Korean Patent No. 10-0734731 discloses a "Braille outputting module and a display apparatus with the same".

The braille outputting module is configured with a guide and a piezoelectric actuator. A shaft of the piezoelectric actuator is output to display braille information by passing through a column hole of the housing.

The foregoing is intended merely to aid in the understanding of the background of the present invention, and is not intended to mean that the present invention falls within the purview of the related art that is already known to those skilled in the art.

Documents of Related Art (Patent Document 1) Korean Patent No. 10-0734731 (Registration date: Jun. 27, 2007)

SUMMARY OF THE INVENTION

Accordingly, the present invention has been made keeping in mind the above problems occurring in the prior art, and an object of the present invention is to provide a display module for visually impaired persons which has a simple configuration, is easy to control by minimizing a number of units to be controlled when displaying information by using protrusions, enforces the durability, and is controlled by using a motor with low output.

The technical objects that can be achieved through the present invention are not limited to what has been particularly described hereinabove and other technical objects not described herein will be more clearly understood by persons skilled in the art from the following detailed description In order to achieve the above object, according to one aspect of the present invention, there is provided a display module for visually impaired persons, the display module including: a display unit in which a plurality of through holes is arranged in a predetermined array; a braille block provided below each through hole and vertically moving whereby an upper protrusion thereof protrudes above the protrusion through hole when the braille block moves upwardly; a lateral latch provided below the display unit in a lateral direction, and restricting movement of the braille block in each of laterally arranged protrusion through holes of the display unit and releasing the restriction; a longitudinal latch provided below the display unit in a longitudinal direction, and restricting movement of the braille block in each of longitudinally arranged protrusion through holes of the display unit and releasing the restriction; an upper base in which the display unit, the braille block, the lateral latch, and the longitudinal latch are installed; a lower block provided below each braille block, vertically moving, and pushing the braille block upwardly when the lower block moves upwardly; an elastic unit provided below each lower block and providing force to upwardly push the lower block; a lower base in which the lower block and the elastic unit are installed; and a lower adjustment unit for vertically moving the lower base.

In addition, the braille block may include: an upper movement shaft portion formed by extending from a lower part of the upper protrusion and having a pillar shape; an engagement portion formed on the upper movement shaft portion by being protruded or depressed in a horizontal direction; and an upper movement stop portion formed on the upper movement shaft portion or formed by extending from a lower part of the upper movement shaft portion, and having a pillar shape with a cross-sectional area greater than a cross-sectional area of the protrusion through hole.

In addition, the lateral latch may be coupled so as to move in a horizontal direction based on the upper movement shaft portion, and formed with a lateral latch slot through which the upper movement shaft portion vertically moves in the lateral latch.

In addition, the longitudinal latch may be coupled so as to move in a horizontal direction based on the upper movement shaft portion, and formed with a longitudinal latch slot through which the upper movement shaft portion vertically moves in the longitudinal latch.

In addition, the lower block may include: a lower movement shaft portion formed in a pillar shape at an upper part thereof; and a lower movement stop portion formed on the lower movement shaft portion or formed by extending from a lower part of the lower movement shaft portion, and having a pillar shape with a cross-sectional area greater than a cross-sectional area of the lower movement shaft portion.

In addition, the lower block may further include an elastic unit upper fixing portion formed by being protruded or recessed in a vertical direction at a lower part thereof.

In addition, the upper base may be formed with an upper base hole through which the lower movement shaft portion of the lower block passes.

In addition, the lower base may be formed with: a lower block movement path formed to receive the lower block and the elastic unit therein, and having a pillar shape to allow the lower block to vertically move therethrough; and a lower base hole formed above the lower block movement path to communicate with an outside and to allow the lower movement shaft portion to vertically move therethrough, wherein a section where the lower block movement path is formed may be configured to be partially divided.

In addition, the lower base may further include an elastic unit lower fixing portion formed by being protruded or recessed in the vertical direction at a lower part thereof.

In addition, the lower adjustment unit may be provided with a protrusion portion formed by partially protruding therefrom, wherein the protrusion portion may upwardly push the lower base while sliding on a module base provided below the lower adjustment unit.

According to a display module for visually impaired persons, a display system for visually impaired persons, and a control method therefor according to an embodiment of the present invention, information such as braille words, figures, and images is displayed by operating a lateral latch and a longitudinal latch in row and column units. Accordingly, a configuration for the same becomes simple, and a control thereof becomes convenient by minimizing a number of units to be controlled when displaying information by using protrusions (conventionally, n*m units are operated, but in the present invention, n+m+1 units are operated).

In addition, a lateral latch and a longitudinal latch function to lock a braille block, a lower adjustment unit pushes upwardly a lower base, and an upper protrusion protrudes by a lower block supported by an elastic unit. Therefore, a product capable of expressing the braille in a simpler form can be provided. In addition, the durability can be improved since the influence by external force on an upper base is small.

In addition, the lateral latch and the longitudinal latch functions to lock the braille block, and a motor with the same low output which is a combination of a number of rows and a number of columns is used. Accordingly, the unit cost of production can be further reduced.

In addition, by alternately installing motors at one side and the other side of the lateral latch and the longitudinal latch, a limit in size due to a size of the motor can be overcome, and thus the product can be made more compact.

In addition, by forming an upper movement shaft portion, engagement portion and an upper movement stop portion in a braille block, the braille block can be processed in a simple form.

In addition, by forming a lateral latch slot in the lateral latch, the braille block can be fixed in a simple form.

In addition, by forming a longitudinal latch slot in the longitudinal latch, the braille block can be in fixed a simple form.

In addition, by forming a lower movement shaft portion and a lower movement stop portion in a lower block, the lower block can be processed in a simple form.

In addition, by forming an elastic unit upper fixing portion in the lower block, an elastic unit can be easily installed in the lower block.

In addition, by forming an upper base hole in an upper base, a partial upper part of the lower block can push upwardly the braille block while preventing the braille block from falling down.

In addition, by forming a lower block movement path and a lower base hole in a lower base, and configuring the lower base hole to be divided, the lower block and the elastic unit can be easily installed in the lower base hole.

In addition, by forming an elastic unit lower fixing portion in the lower base, the elastic unit can be easily installed in the lower base.

In addition, by forming a protrusion portion in the lower adjustment unit so as to slide along a module base, a structure of pushing the lower base upwardly can be simplified.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
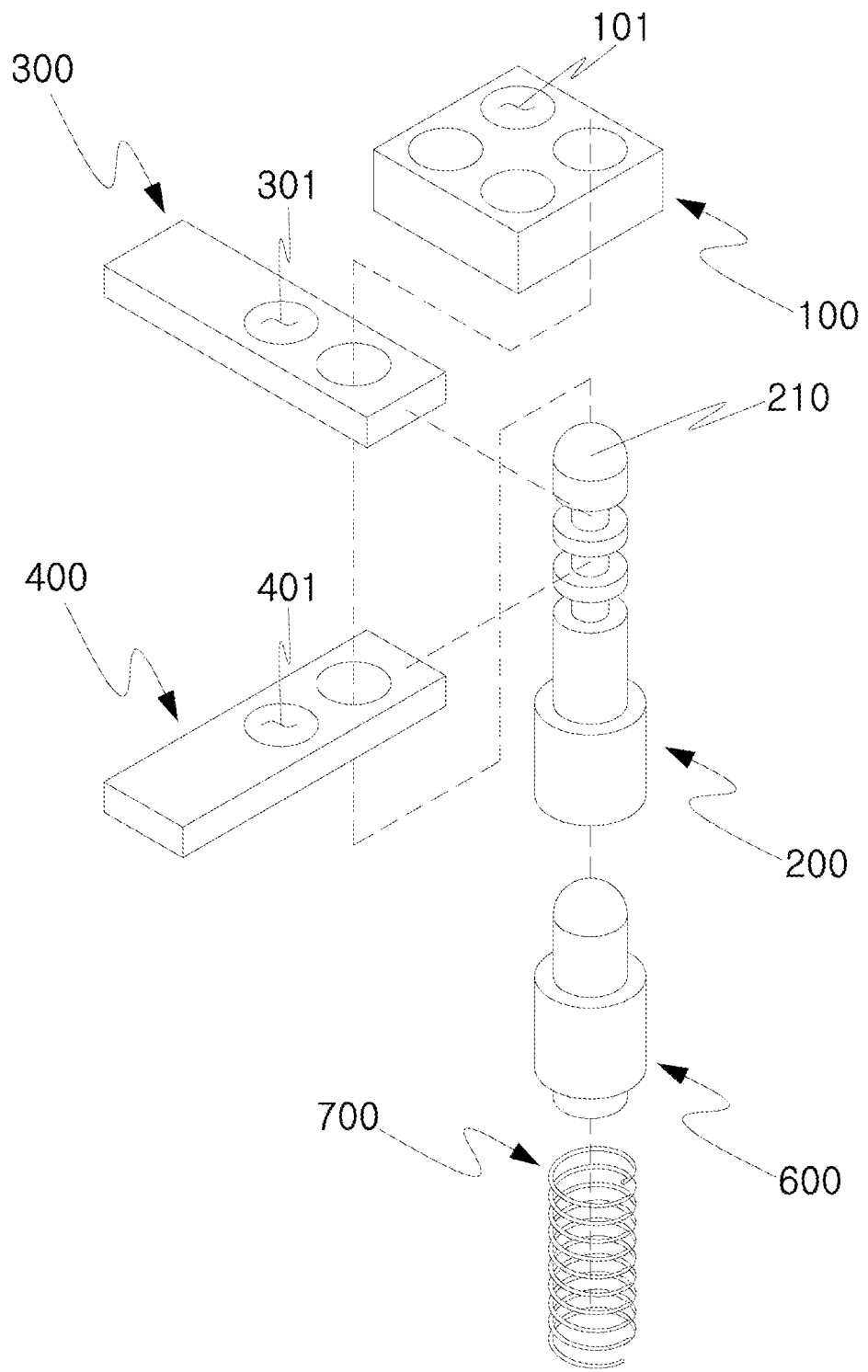
FIG. 1 is a view of a conceptual diagram showing a part of an exploded display module for visually impaired persons according to an embodiment of the present invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

It will be understood that when an element is referred to as being "connected" or "coupled" to another element, it can be directly connected or coupled to the other element or intervening elements may be present.

In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular example embodiments only and is not intended to be limiting of the present inventive concept. As used herein, the singular forms "a", "an", and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings. First of all, the terminologies or words used in the description and the claims of the present invention should not be interpreted as being limited merely to common and dictionary meanings. On the contrary, they should be interpreted based on the meanings and concepts of the invention in compliance with the scope of the invention on the basis of the principle that the inventor(s) can appropriately define the terms in order to describe the invention in the best way. In addition, unless otherwise stated, technical and scientific terms as used herein have a meaning generally understood by those skilled in the art. Descriptions of known functions and constructions which may unnecessarily obscure the subject matter of the present invention will be omitted. The exemplary embodiments of the present invention to be described below are provided by way of example so that the idea of the present invention can be sufficiently transferred to those skilled in the art to which the present invention pertains. Therefore, the present invention is not limited to the exemplary embodiments set forth herein but may be modified in many different forms. In addition, throughout the specification, like reference numerals denote like elements. In the drawings, it is to be noted that the same elements or parts are denoted by the same reference numerals whenever possible.

Figure 2:
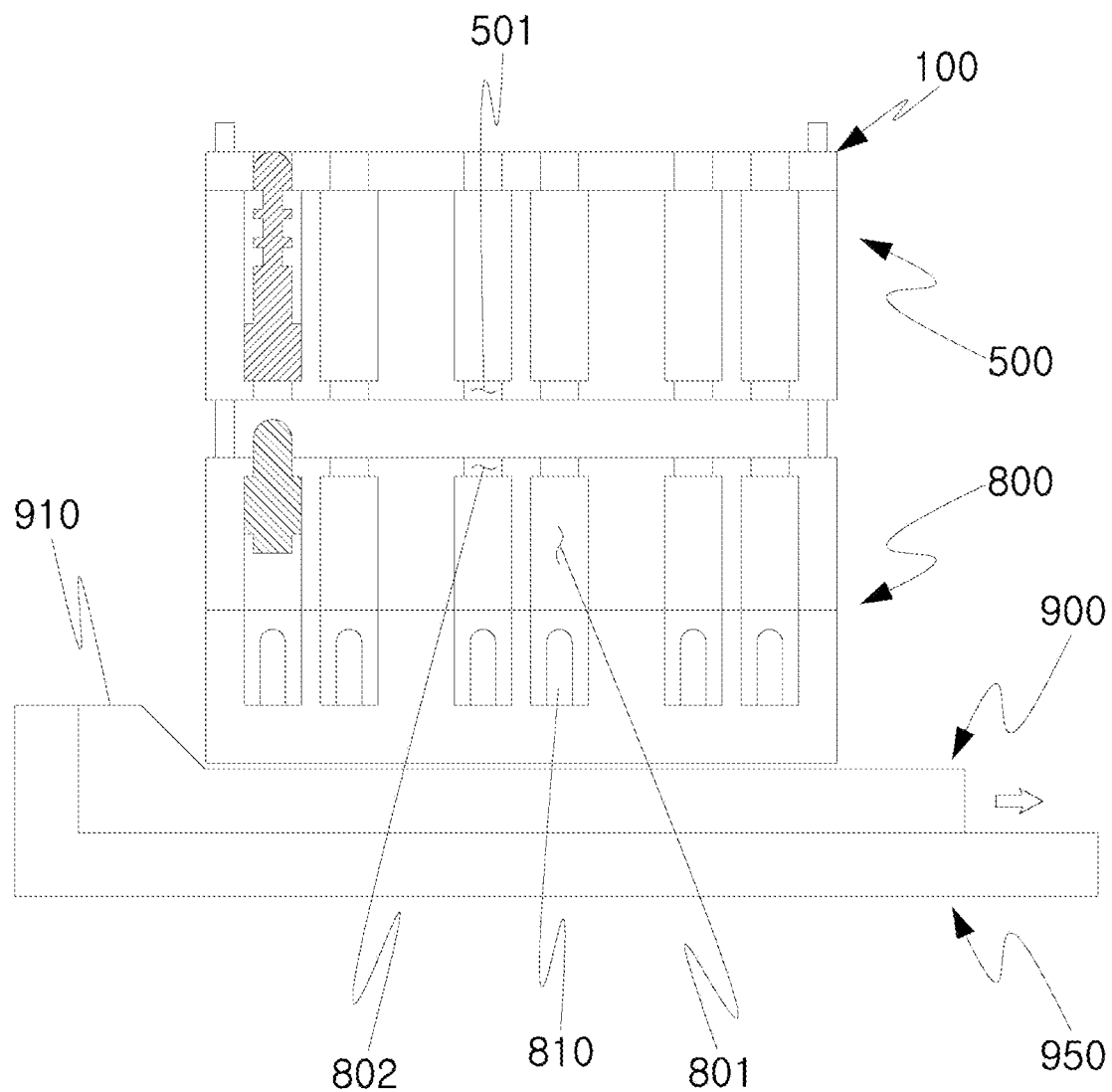
FIG. 2 is a view of a conceptual diagram showing a part of a cutaway example of a part of a display module for visually impaired persons according to an embodiment of the present invention.
Figure 3:
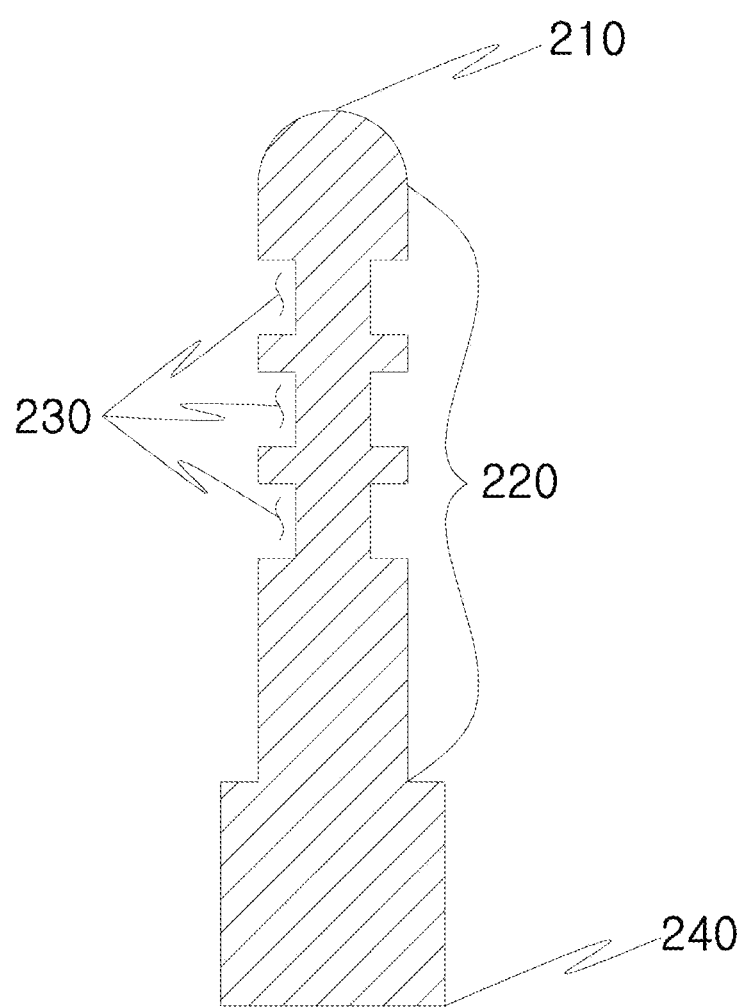
FIG. 3 is a view of a conceptual diagram showing a cutaway example of a braille block of FIG. 1.
Figure 4:
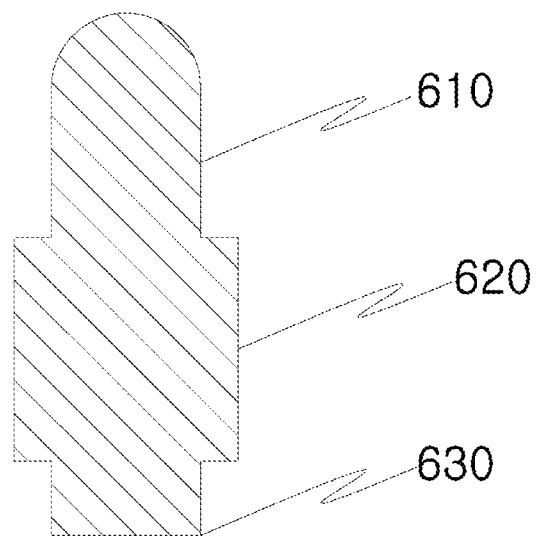
FIG. 4 is a view of a conceptual diagram showing a cutaway example of a lower block of FIG. 1.
Figure 5:
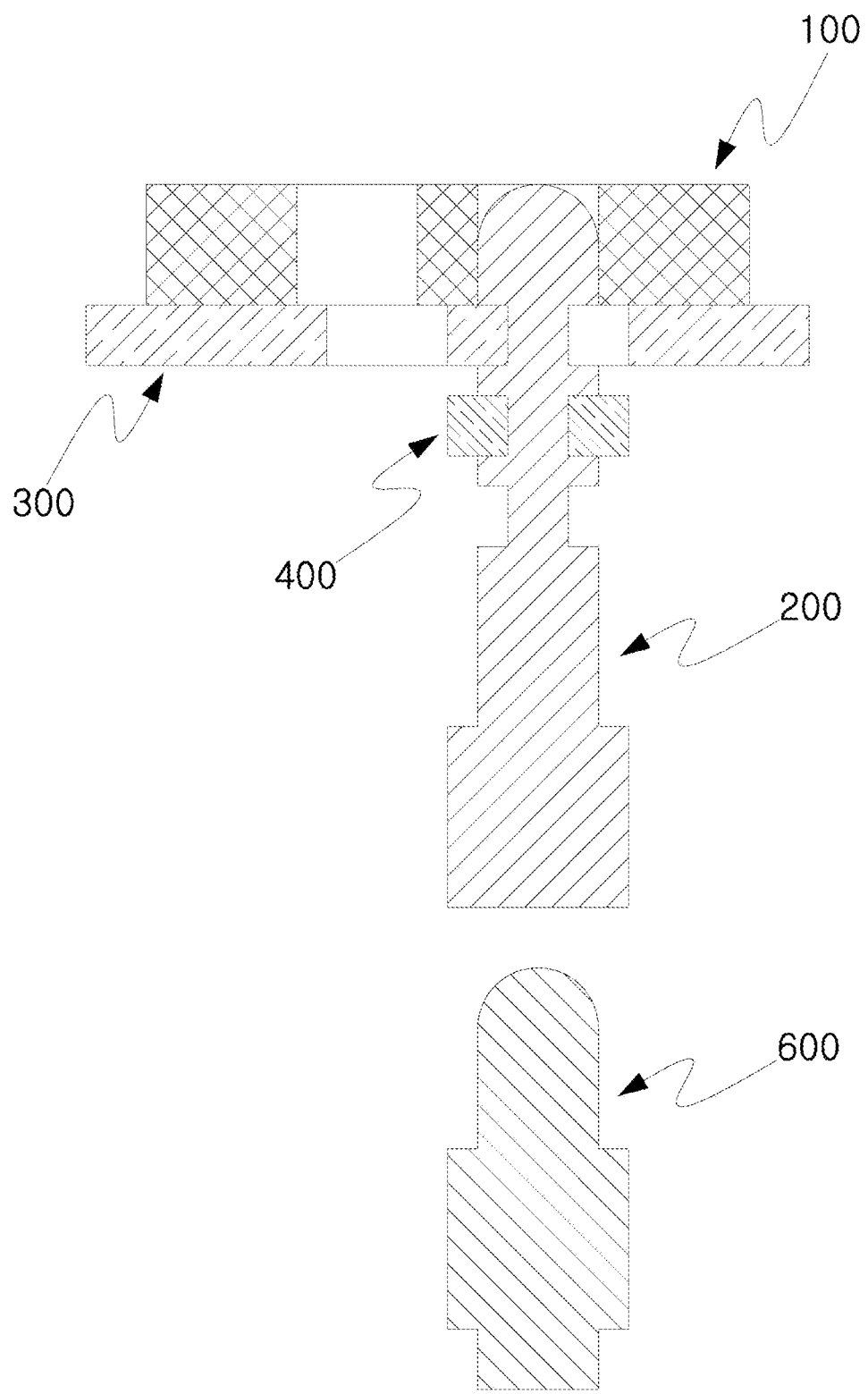
FIG. 5 is a view of a conceptual diagram showing a state where a lateral latch and a longitudinal latch of FIG. 1 lock a braille block, and a lower block does not push the braille block upwardly.
Figure 6:
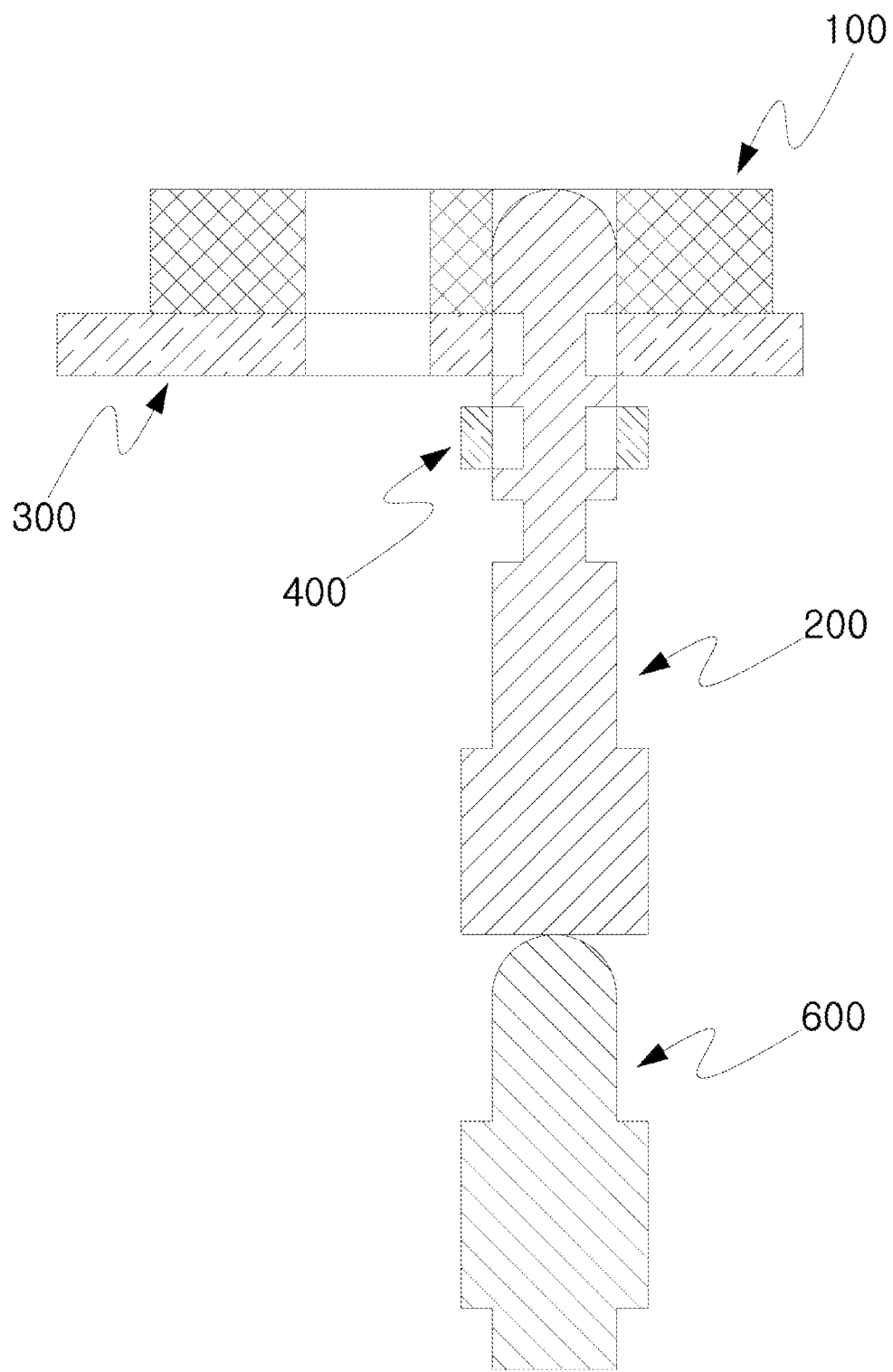
FIG. 6 is a view of a conceptual diagram showing a state where a lateral latch and a longitudinal latch of FIG. 1 releases a lock state of a braille block, and a lower block is raised up to the braille block.
Figure 7:
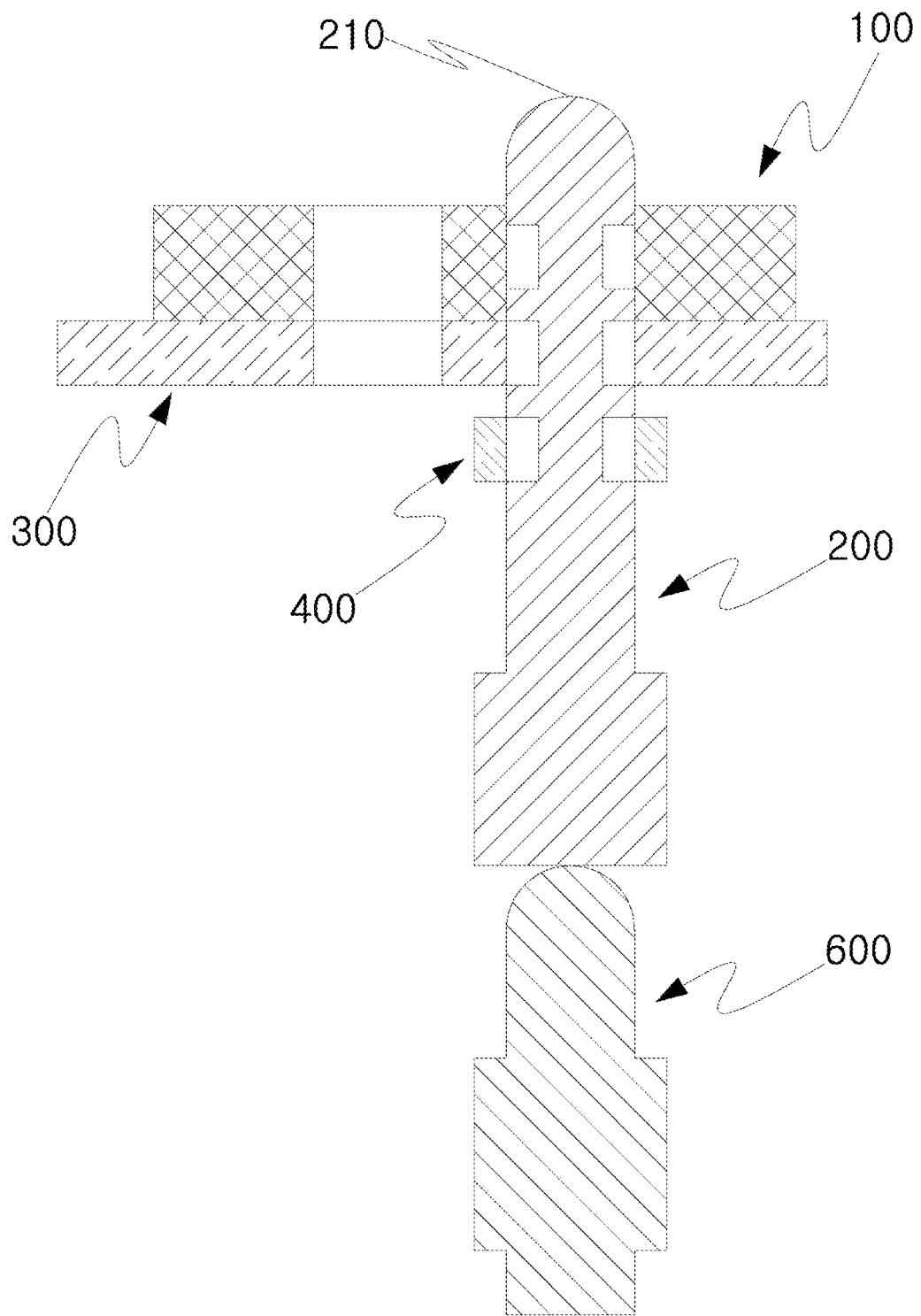
FIG. 7 is a view of a conceptual diagram showing a state where a lateral latch and a longitudinal latch of FIG. 1 releases a lock state of a braille block, and a lower block pushes the braille block upwardly so that the braille block protrudes.
Figure 8:
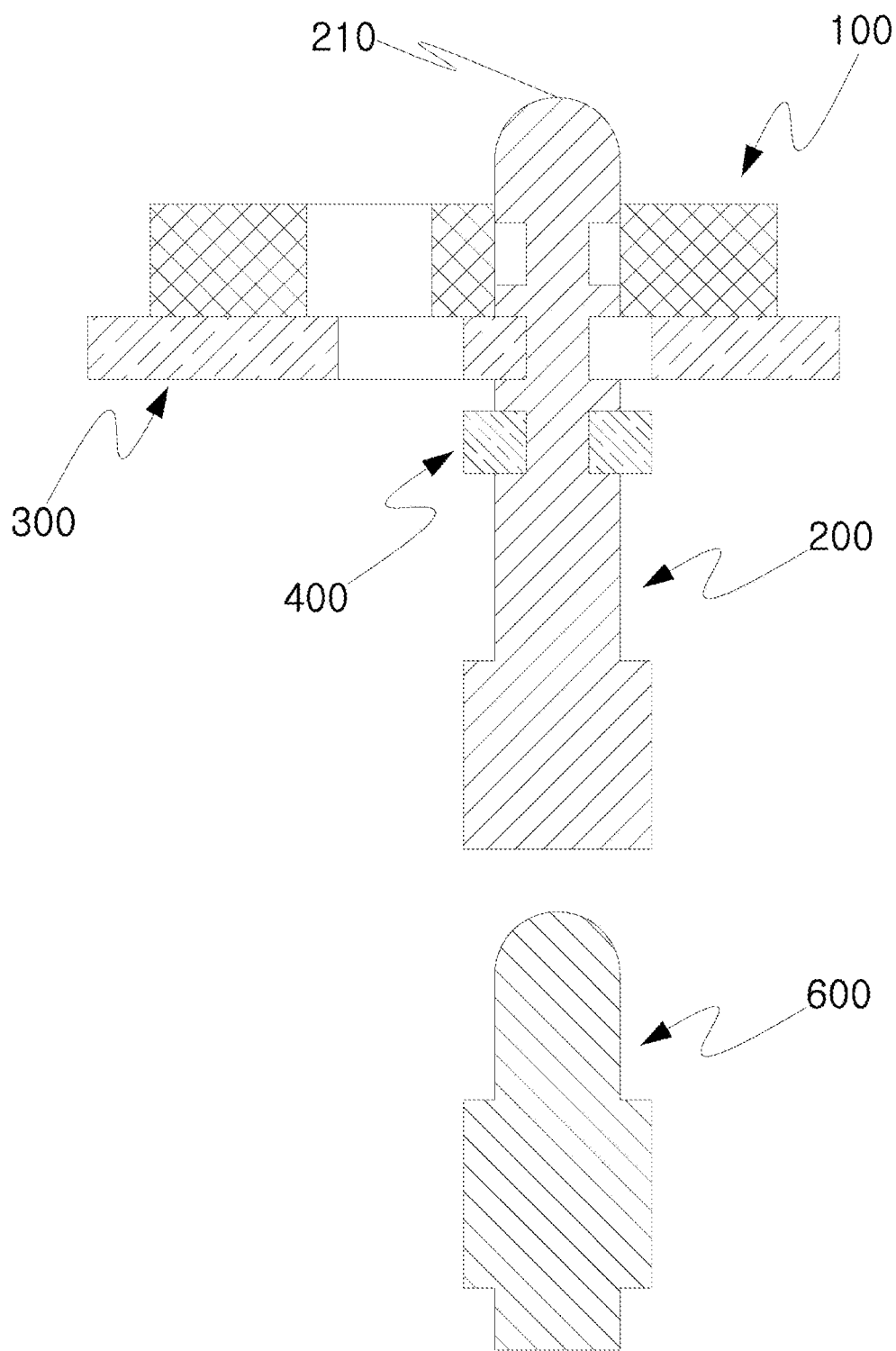
FIG. 8 is a view of a conceptual diagram showing a state where a lateral latch and a longitudinal latch of FIG. 1 lock a braille block, and the braille block is fixed (protruded state) even though a lower block does not upwardly push the braille block.
Figure 9:
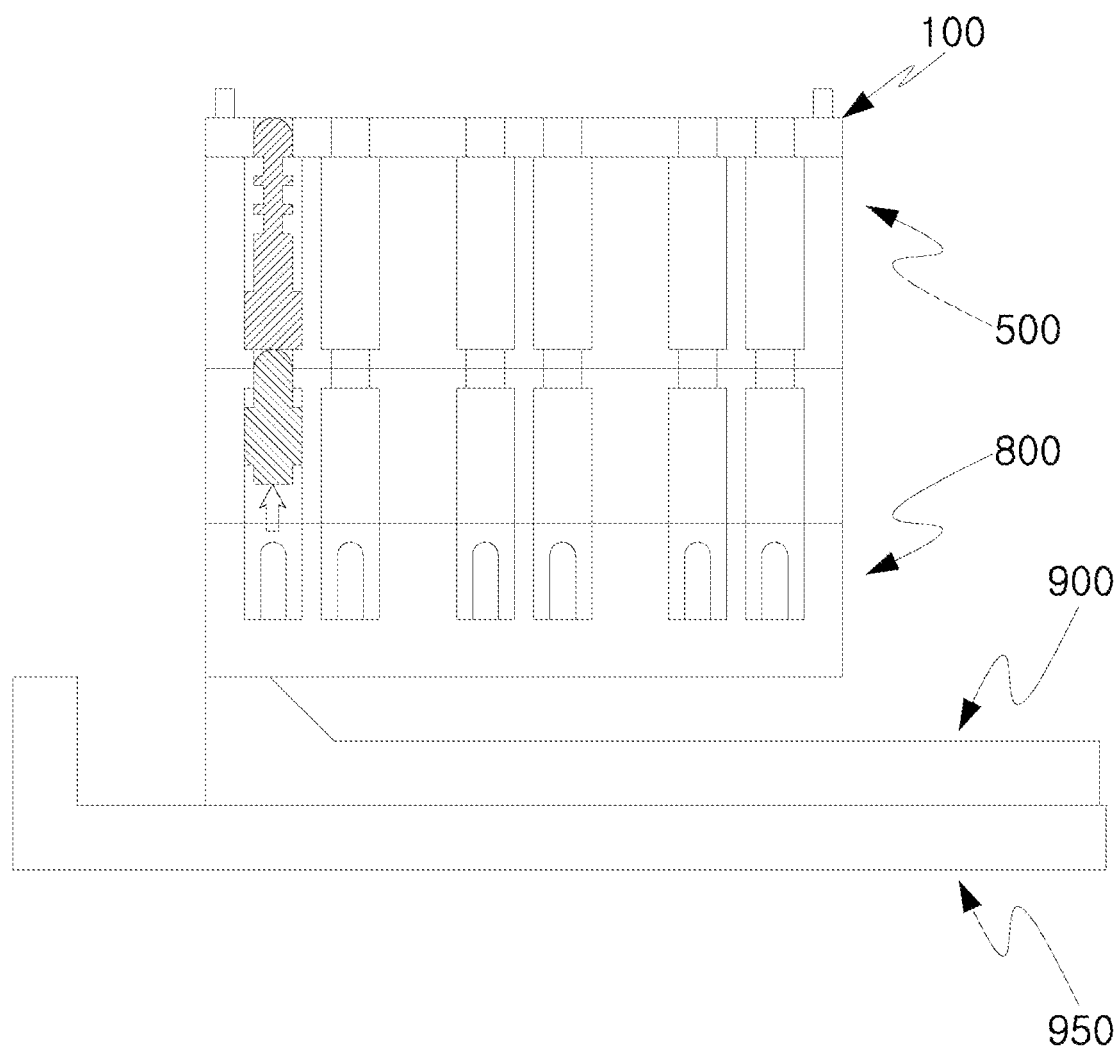
FIG. 9 is a view of a conceptual diagram showing a state where a lower adjustment unit of FIG. 2 pushes a lower block upwardly but a braille block is in a lock state so that the braille block does not protrude above a display unit.
Figure 10:
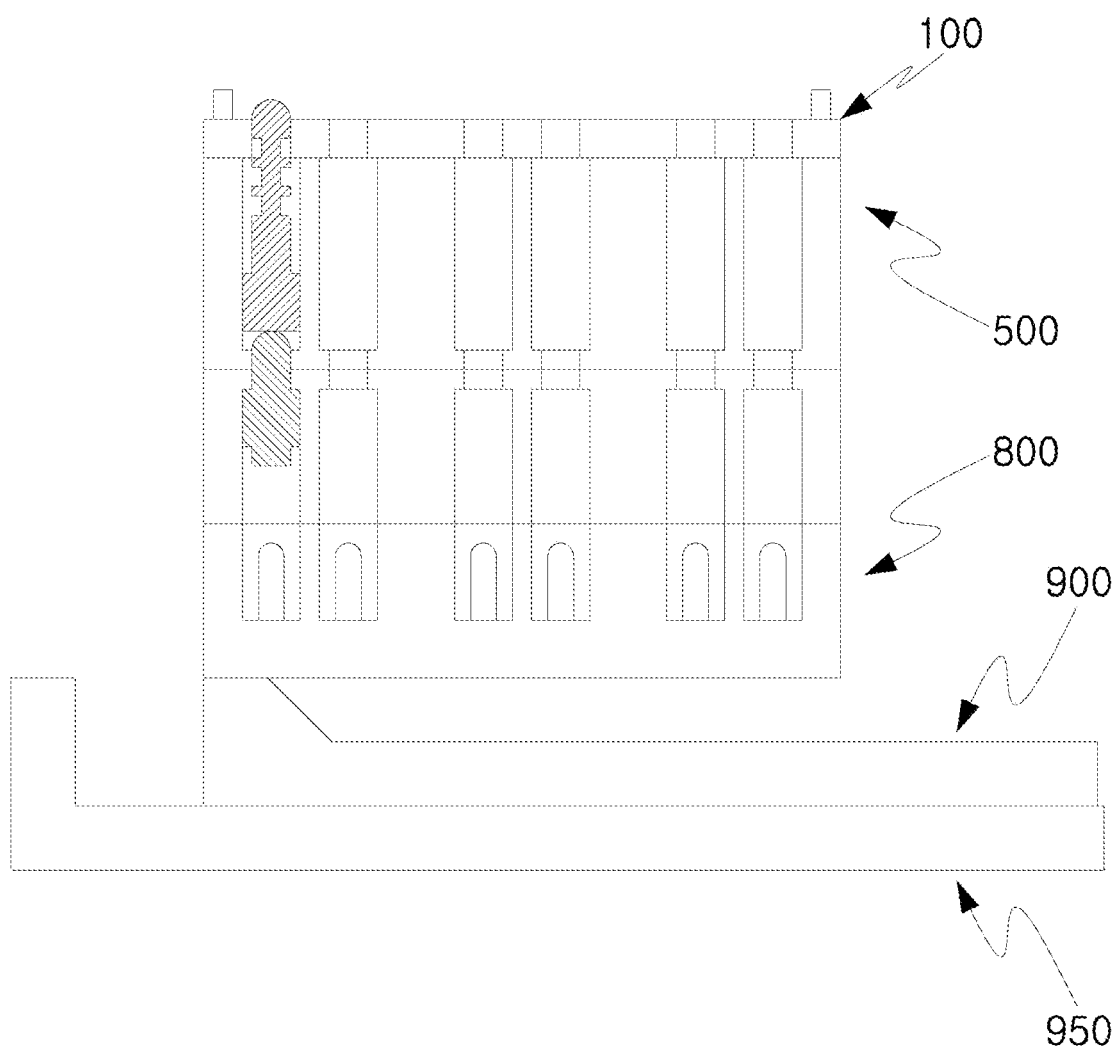
FIG. 10 is a view of a conceptual diagram showing a state where a lower adjustment unit of FIG. 2 pushes upwardly a lower block, and a braille block is released from a lock state so that the braille block protrudes above a display unit.
Figure 11:
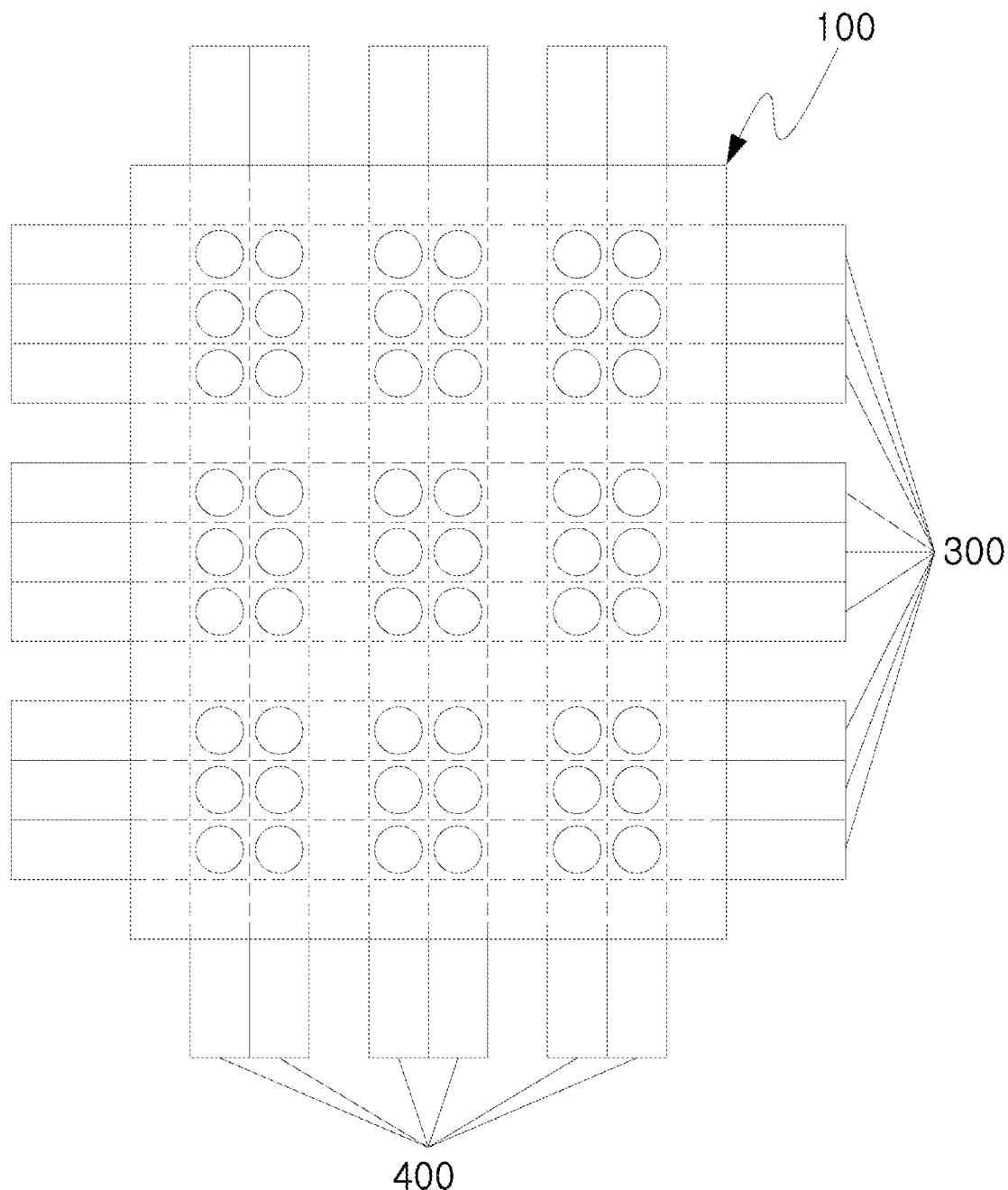
FIGS. 11 and 12 are views of a conceptual diagram showing an example of a display module for visually impaired persons according to an embodiment of the present invention as viewed from above.
Figure 12:
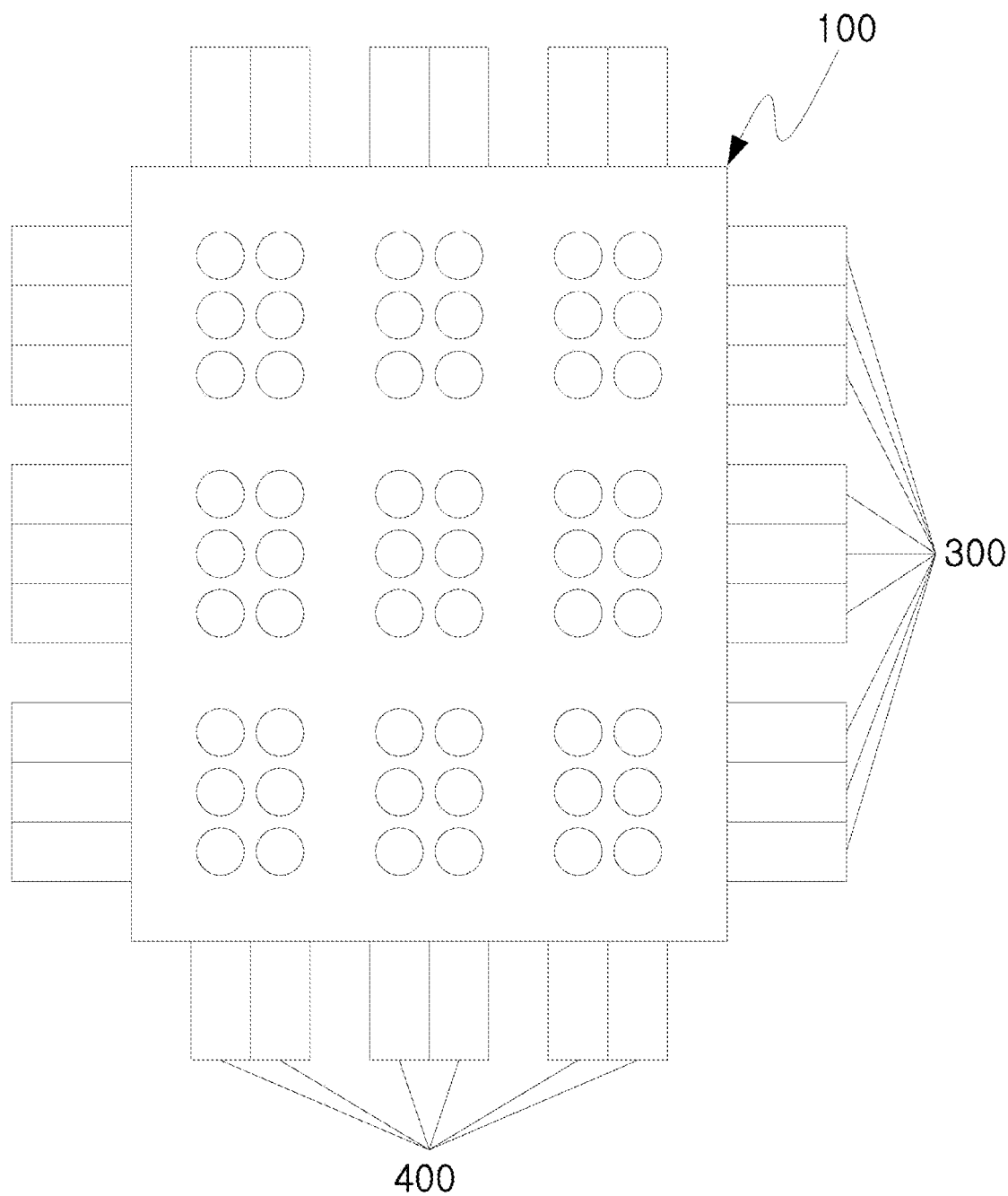
Figure 13:
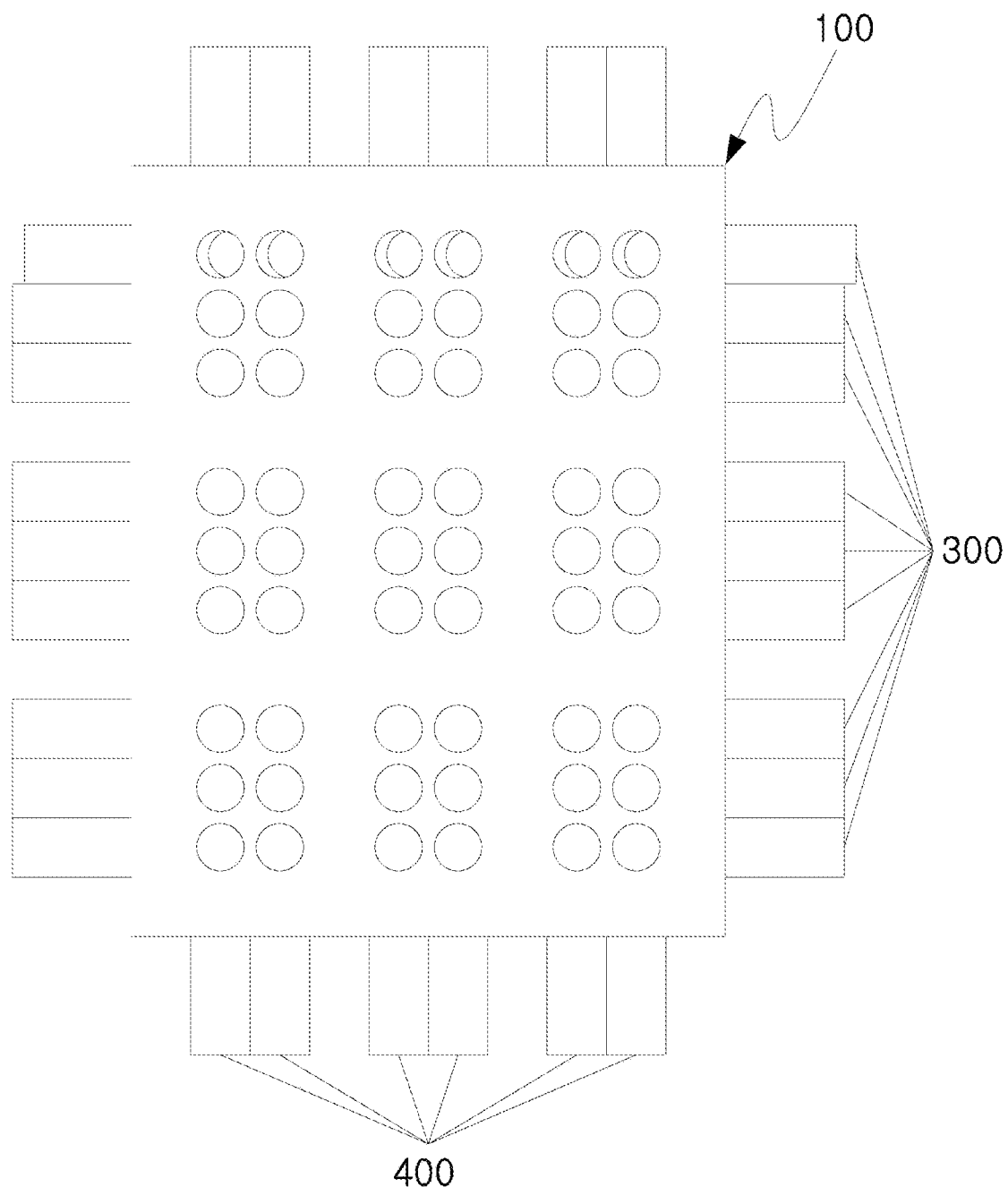
FIG. 13 is a view of a conceptual diagram showing a lock state of a lateral latch responsible for a first row in FIG. 12.
Figure 14:
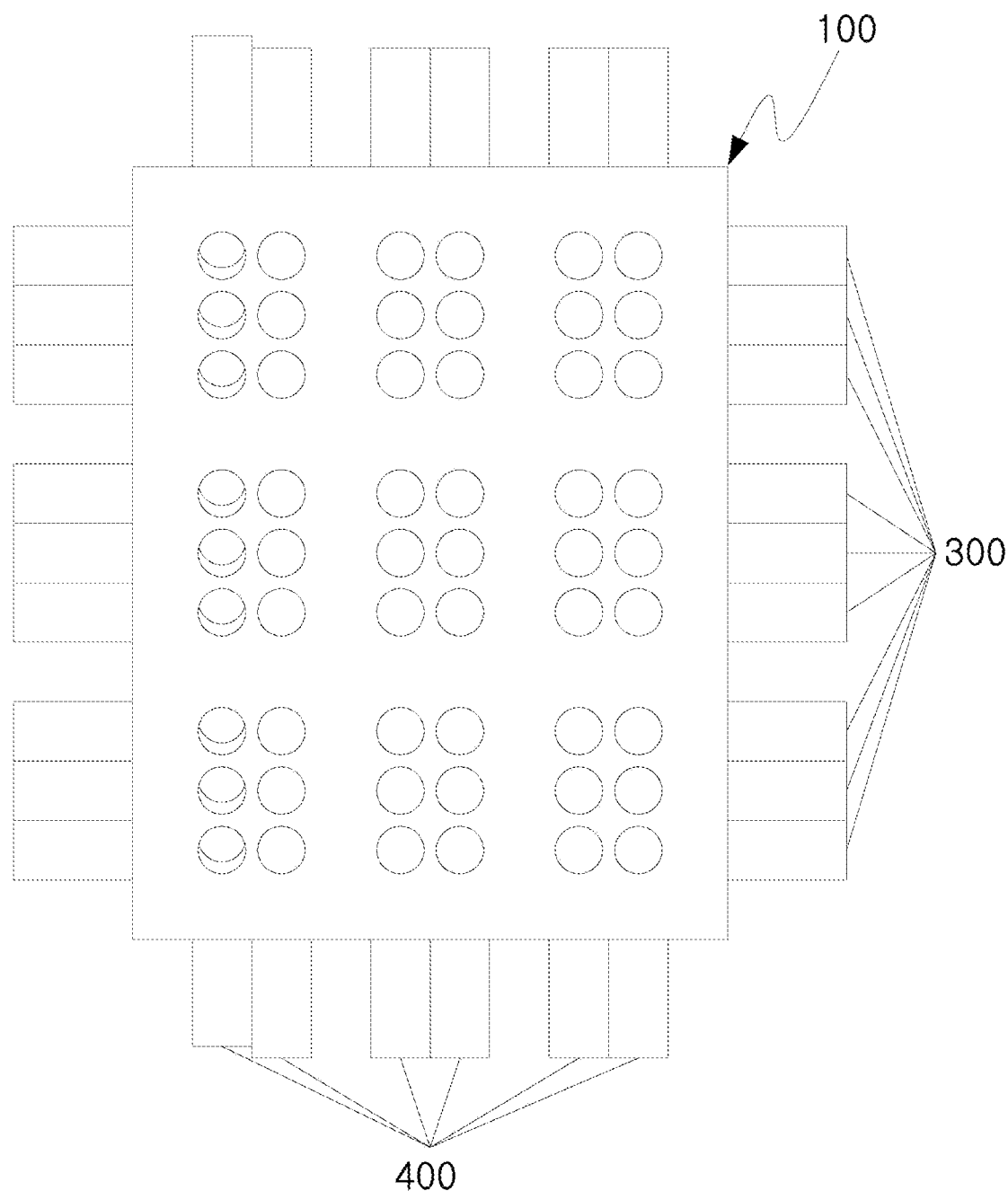
FIG. 14 is a view of a conceptual diagram showing a lock state of a longitudinal latch responsible for a first column in FIG. 12.
Figure 15:
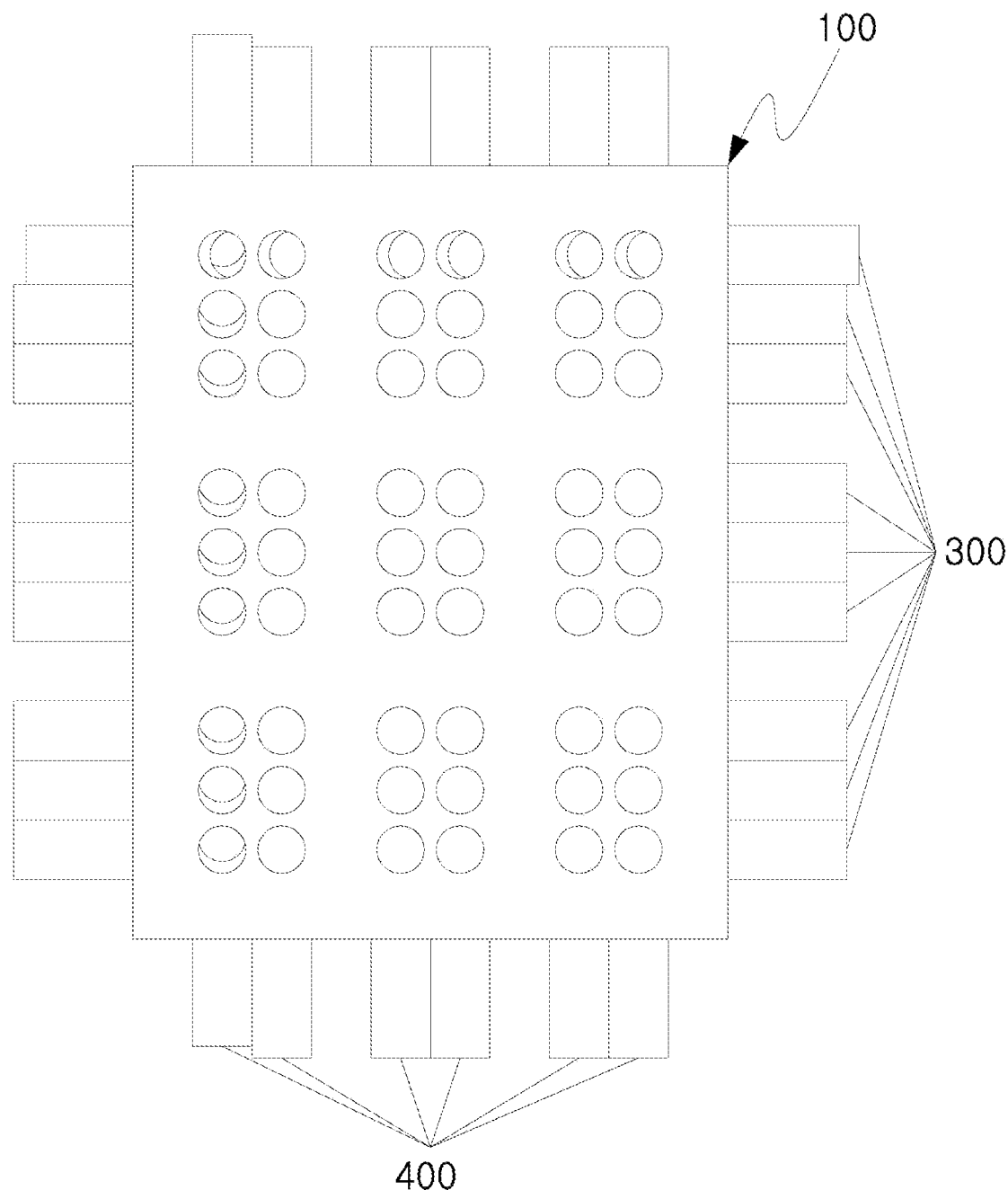
FIG. 15 is a view of a conceptual diagram showing a lock state of a lateral latch responsible for a first row and a longitudinal latch responsible for a first column in FIG. 12.

FIG. 1 is a view of a conceptual diagram showing a part of an exploded display module for visually impaired persons according to an embodiment of the present invention, FIG. 2 is a view of a conceptual diagram showing a part of a cutaway example of a part of a display module for visually impaired persons according to an embodiment of the present invention, FIG. 3 is a view of a conceptual diagram showing a cutaway example of a braille block of FIG. 1, FIG. 4 is a view of a conceptual diagram showing a cutaway example of a lower block of FIG. 1, FIG. 5 is a view of a conceptual diagram showing a state where a lateral latch and a longitudinal latch of FIG. 1 lock a braille block, and a lower block does not push the braille block upwardly, FIG. 6 is a view of a conceptual diagram showing a state where a lateral latch and a longitudinal latch of FIG. 1 releases a lock state of a braille block, and a lower block is raised up to the braille block, FIG. 7 is a view of a conceptual diagram showing a state where a lateral latch and a longitudinal latch of FIG. 1 releases a lock state of a braille block, and a lower block pushes the braille block upwardly so that the braille block protrudes, FIG. 8 is a view of a conceptual diagram showing a state where a lateral latch and a longitudinal latch of FIG. 1 lock a braille block, and the braille block is fixed (protruded state) even though a lower block does not upwardly push the braille block, FIG. 9 is a view of a conceptual diagram showing a state where a lower adjustment unit of FIG. 2 pushes a lower block upwardly but a braille block is in a lock state so that the braille block does not protrude above a display unit, FIG. 10 is a view of a conceptual diagram showing a state where a lower adjustment unit of FIG. 2 pushes upwardly a lower block, and a braille block is released from a lock state so that the braille block protrudes above a display unit, FIGS. 11 and 12 are views of a conceptual diagram showing an example of a display module for visually impaired persons according to an embodiment of the present invention as viewed from above, FIG. 13 is a view of a conceptual diagram showing a lock state of a lateral latch responsible for a first row in FIG. 12, FIG. 14 is a view of a conceptual diagram showing a lock state of a longitudinal latch responsible for a first column in FIG. 12, and FIG. 15 is a view of a conceptual diagram showing a lock state of a lateral latch responsible for a first row and a longitudinal latch responsible for a first column in FIG. 12.

In order to display information such as braille words, figures, and images by vertically moving a plurality of protrusions, conventionally, the plurality of protrusions is respectively controlled. However, in the present invention, a number of units to be controlled is minimized by controlling the plurality of protrusions in row and column units. Accordingly, the present invention provides a display module for visually impaired persons which has a simple configuration, and is easy to control.

As shown FIGS. 1 and 2, a display module for visually impaired persons according to an embodiment of the present invention includes a display unit 100, a braille block 200, a lateral latch 300, a longitudinal latch 400, an upper base 500, a lower block 600, an elastic unit 700, a lower base 800, and a lower adjustment unit 900.

In the display unit 100, a plurality of protrusion through holes 101 is arranged in a predetermined array.

In the display unit 100, a plurality of protrusion through holes 101 is arranged in a predetermined array to display information such as braille words, figures, and images as a plurality of protrusions protrudes through the plurality of through holes 101. For example, the plurality of through holes 101 may be arranged in an array such as 9 rows*6 columns (Refer to FIGS. 11 to 15).

The braille block 200 is provided below each protrusion through hole 101, vertically moves, and an upper protrusion 210 thereof protrudes above the protrusion through hole 101 when the braille block 200 moves upwardly.

In other words, when the braille block 200 moves upwardly, the upper protrusion 210 may protrude above the protrusion through hole 101, and when the braille block 200 moves downwardly, the upper protrusion 210 may be recessed into the protrusion through hole 101.

The lateral latch 300 is provided below the display unit 100 in a lateral (row) direction, and restricts movement of the braille block 200 in each of laterally arranged protrusion through holes 101 of the display unit 100, and releases the restriction.

The lateral latch 300 may fix a vertical position of the braille block 200.

In other words, the lateral latch 300 may enable (unlock) or disable (lock) vertical movement of the braille block 200.

That is, under a state where the upper protrusions 210 protrude above the protrusion through holes 101, the lateral latch 300 may fix the braille blocks 200 of a corresponding row according to a position of the lateral latch 300 such that the braille blocks 200 do not vertically move, or under a state where the upper protrusions 210 are recessed into the protrusion through holes 101, the lateral latch 300 may fix the braille blocks 200 of a corresponding row according to a position of the lateral latch 300 such that the braille blocks 200 do not vertically move.

The longitudinal latch 400 is provided blow the display unit 100 in a longitudinal (column) direction, and restricts movement of the braille block 200 in each of longitudinally arranged protrusion through holes 101 of the display unit 100, and releases the restriction.

The longitudinal latch 400 may fix a vertical position of the braille block 200.

In other words, the longitudinal latch 400 may enable (unlock) or disable (lock) vertical movement of the braille block 200.

That is, under a state where the upper protrusions 210 protrude above the protrusion through holes 101, the longitudinal latch 400 may fix the braille blocks 200 of a corresponding column according to a position of the longitudinal latch 400 such that the braille blocks 200 do not vertically move, or under a state where the upper protrusions 210 are recessed into the protrusion through holes 101, the longitudinal latch 400 may fix the braille blocks 200 of a corresponding column according to a position of the longitudinal latch 400 such that the braille blocks 200 do not vertically move.

In other words, the braille block 200 becomes a fixed state so that the braille block 200 is disabled to vertically move when one of the lateral latch 300 and the longitudinal latch 400 locks of the braille block 200.

In FIG. 1, the longitudinal latch 400 is provided below the lateral latch 300, but the present invention is not limited thereto. The longitudinal latch 400 may be provided above the lateral latch 300.

In the upper base 500, the display unit 100, the braille block 200, the lateral latch 300, and the longitudinal latch 400 are installed.

The upper base 500 is for installing the display unit 100, the braille block 200, the lateral latch 300, and the longitudinal latch 400, and functions as a base or housing for fixing the position of the display unit 100, the lateral latch 300, and the longitudinal latch 400 in a vertical direction. Herein, the display unit 100 is fixed, the lateral latch 300 and the longitudinal latch 400 are installed to move in lateral and longitudinal directions, and the braille block 200 is installed to move in a vertical direction.

The lower block 600 is provided below each braille block 200, vertically moves, and pushes the braille block 200 upwardly when the lower block 600 moves upwardly.

The lower block 600 pushes the braille block 200 upwardly which is not fixed by the lateral latch 300 or the longitudinal latch 400.

The elastic unit 700 is provided below each lower block 600, and provides force for upwardly pushing the lower block 600.

For the elastic unit 700, a spring (coil spring), etc. may be used.

In the lower base 800, the lower block 600 and the elastic unit 700 are installed.

The lower base 800 is for installing the lower block 600 and the elastic unit 700, and functions as a base of housing for receiving the lower block 600 and the elastic unit 700. Herein, the lower block 600 and the elastic unit 700 are installed in the lower base 800 such that the same are not detached therefrom, the lower block 600 is installed to be pushed upwardly by the elastic unit 700, and the lower block 600 is installed such that a partial upper part thereof protrudes above the lower base 800.

In other words, when an obstacle (braille block 200) is not present above the lower base 800, the partial upper part of the lower block 600 protrudes above the lower base 800, and when an obstacle (braille block 200) is present above the lower base 800 so that the lower base 800 is not pushed upwardly by elastic force of the elastic unit 700, the lower block 600 moves downwardly.

The lower adjustment unit 900 is for vertically moving the lower base 800.

The lower adjustment unit 900 may be installed below the lower base 800 so as to vertically move the lower base 800. However, various implementations are possible as long as the lower base 800 vertically moves the lower base 800 irrespective of its position, for example, vertically moving the lower base 800 by being installed in the side of the lower base 800.

As shown in FIG. 3, the braille block 200 of the display module for visually impaired persons according to an embodiment of the present invention may include an upper movement shaft portion 220, an upper movement stop portion 240, and an engagement portion 230.

The upper movement shaft portion 220 is formed by extending from a lower part of the upper protrusion 210, and to have a pillar shape.

The upper movement shaft portion 220 is a configuration for vertically moving the braille block 200, and may have a pillar shape such that the braille block 200 vertically moves while the upper movement shaft portion 220 is engaged with the lateral latch 300 and the longitudinal latch 400.

In FIG. 1, the upper movement shaft portion 220 has a cylindrical shape, but the present invention is not limited thereto. Various implementations such as triangular pillar, square pillar, polygonal pillar, elliptical pillar, etc. are possible as long as the braille block 200 vertically moves while the upper movement shaft portion 220 is engaged with the lateral latch 300 and the longitudinal latch 400.

The engagement portion 230 is formed on the upper movement shaft portion 220 by being protruded or depressed in a horizontal direction.

The engagement portion 230 is a configuration for restricting vertical movement of the braille block 200 or for releasing the restriction, and in FIG. 1, the engagement portion 230 has a cylindrical shape and a depressed form. However, the present invention is not limited thereto and various implementations are possible as long as the engagement portion 230 restricts vertical movement of the braille 200 or releases the restriction according to a position of the lateral latch 300 and the longitudinal latch 400.

In addition, three engagement portions 230 are formed in FIG. 1, but the present invention is not limited thereto. A least two engagement portions 230 may be formed, or a plurality of engagement portions 230 such as four engagement portions may be formed.

The upper movement stop portion 240 is formed on the upper movement shaft portion 220 or formed by extending from a lower part of the upper movement shaft portion 220, and to have a pillar shape with a cross-sectional area larger than a cross-sectional area of the protrusion through hole 101.

The upper movement stop portion 240 functions to simultaneously prevent the braille block 200 from protruding above the display unit 100 more than necessary, and from descending below the upper base 500 that will be described later.

In other words, the upper movement stop portion 240 is a configuration for preventing the braille block 200 from being lost.

In FIG. 1, the upper movement stop portion 240 has a cylindrical shape with a diameter greater than a diameter of the upper movement shaft portion 220, but the present invention is not limited thereto. Various implementations such as triangular pillar, square pillar, polygonal pillar, elliptical pillar, partially protruding shape, etc. are possible as long as the upper movement stop portion 240 simultaneously prevent the braille block 200 from protruding above the display unit 100 more than necessary and from descending below the upper base 500 that will be described later.

As shown in FIG. 1, the lateral latch 300 of the display module for visually impaired persons according to an embodiment of the present invention is coupled so as to move in a lateral direction based on the upper movement shaft portion 220, and is formed with a lateral latch slot 301 through which the upper movement shaft portion 220 vertically moves in the lateral latch 300.

The lateral latch 300 is a configuration for fixing the braille block 200 such that the braille block 200 is disabled to vertically move, or for releasing the fixed braille block 200 such that the braille block 200 vertically moves according to movement of the lateral latch 300. For the same, the lateral latch slot 301 is formed in the lateral latch 300.

In FIG. 1, the upper movement shaft portion 220 may vertically move in the lateral latch slot 301 when a position of the lateral latch slot 301 is matched with a position of the upper movement shaft portion 220 (refer to a protrusion through holes 101 of a second row of the display unit 100 of FIG. 13), and the upper movement shaft portion 220 may not move in the lateral latch slot 301 when a position of the lateral latch slot 301 is not matched with a position of the upper movement shaft portion 220 (refer to protrusion through holes 101 of a first row of the display unit 100 of FIG. 13).

In FIG. 1, the lateral latch slot 301 and the upper movement shaft portion 220 have in an identical form, but the present invention is not limited thereto. Various implementations are possible as long as vertical movement of the braille block 200 is restricted or released from the restriction according to a position of the lateral latch 300. For example, a form of the lateral latch slot 301 may be a hole (through hole), a groove (partially recessed), etc.

As shown in FIG. 1, the longitudinal latch 400 of the display module for visually impaired persons according to an embodiment of the present invention is coupled so as to move in a longitudinal direction based on the upper movement shaft portion 220, and formed with a longitudinal latch slot 401 through which the upper movement shaft portion 220 vertically moves in the longitudinal latch 400.

The longitudinal latch 400 is a configuration for fixing the braille block 200 such that the braille block 200 is disabled to vertically move, or for releasing the fixed braille block 200 such that the braille block 200 vertically moves according to movement of the longitudinal latch 400. For the same, the longitudinal latch slot 401 is formed in the longitudinal latch 400.

In FIG. 1, the upper movement shaft portion 220 may vertically move in the longitudinal latch slot 401 when a position of longitudinal latch slot 401 is matched with a position of the upper movement shaft portion 220 (refer to a protrusion through holes 101 of a second column of the display unit 100 of FIG. 14), and the upper movement shaft portion 220 may not move in longitudinal latch slot 401 when a position of the longitudinal latch slot 401 is not matched with a position of the upper movement shaft portion 220 (refer to protrusion through holes 101 of a first column of the display unit 100 of FIG. 14).

In FIG. 1, the longitudinal latch slot 401 and the upper movement shaft portion 220 have in an identical form, but the present invention is not limited thereto. Various implementations are possible as long as vertical movement of the braille block 200 is restricted or released from the restriction according to a position of the longitudinal latch 400. For example, a form of the longitudinal latch slot 401 may be a hole (through hole), a groove (partially recessed), etc.

As shown in FIG. 4, the lower block 600 of the display module for visually impaired persons according to an embodiment of the present invention may include a lower movement shaft portion 610 and a lower movement stop portion 620.

The lower movement shaft portion 610 is formed to have a pillar shape at an upper part thereof.

The lower movement shaft portion 610 is a configuration for vertically moving in a lower base hole 802 that will be described later.

In FIG. 1, the lower movement shaft portion 610 is formed in a cylindrical shape, but the present invention is not limited thereto. Various implementations such as triangular pillar, square pillar, polygonal pillar, elliptical pillar, etc. are possible as long as the lower movement shaft portion 610 vertically moves in the lower base hole 802.

The lower movement stop portion 620 is formed on the lower movement shaft portion 610 or formed by extending from a lower part of the lower movement shaft portion 610, and to have a pillar shape with have a cross-sectional area larger than a cross-sectional area of lower movement shaft portion 610.

The lower movement stop portion 620 is a configuration for preventing the lower block 600 from being detached from the lower base 800.

In other words, the lower movement stop portion 620 is a configuration for preventing lower block 600 from being lost.

In FIG. 1, the lower movement stop portion 620 has a cylindrical shape with a diameter greater than a diameter of the lower movement shaft portion 610, but the present invention is not limited thereto. Various implementations such as triangular pillar, square pillar, polygonal pillar, elliptical pillar, partially protruding shape, etc. are possible as long as the lower movement stop portion 620 prevent the lower base 800 from being detached from the lower base 800.

As shown in FIG. 4, the lower block 600 of the display module for visually impaired persons according to an embodiment of the present invention may further include an elastic unit upper fixing portion 630 formed by being protruded or recessed in a vertical direction at a lower part thereof.

The elastic unit upper fixing portion 630 is a configuration for fixing or guiding an upper part of the elastic unit 700. When the elastic unit 700 is formed in a coil spring form having a cylindrical shape, the elastic unit upper fixing portion 630 may be formed in a cylindrical shape having an outer diameter smaller than a diameter of the elastic unit 700 having the coil spring form.

A method of operating the display module for visually impaired persons according to an embodiment of the present invention will be described with reference to the figure.

FIGS. 5 to 8 are views partially showing a cutaway of a first row and a first column of FIGS. 11 and 12.

FIG. 5 is a view showing a state where the lateral latch 300 and the longitudinal latch 400 lock the braille block 200 shown in a first row and a first column of FIG. 15, and the lower block 600 does not upwardly push the braille block 200 as the lower adjustment unit 900 does not upwardly push the lower base 800 as shown in FIG. 2.

In other words, as shown in FIG. 9, the braille block 200 does not protrude above the display unit 100 even though the lower block 600 upwardly pushes the braille block 200 by upwardly pushing the lower base 800.

Under a state of FIG. 5, when the lateral latch 300 and the longitudinal latch 400 release a lock state of the braille block 200 as shown in a first row and a first column of FIG. 12, and the lower adjustment unit 900 pushes the lower base 800 upwardly as shown in FIG. 10, the lower block 600 pushes the braille block 200 upwardly as shown in FIG. 6, and thus the upper protrusion 210 of the braille block 200 protrudes above the display unit 100 by being upwardly pushed as shown in FIG. 7.

Subsequently, in order to maintain the braille block 200 in a protruded state, as shown in FIGS. 8 and 15, the lateral latch 300 and the longitudinal latch 400 lock the braille block 200 to maintain a protruded state, or at least one of the lateral latch 300 and the longitudinal latch 400 locks the braille block 200 to maintain a protruded state as shown in FIGS. 13 and 14.

Based on the above, a method of operating the entire display module for visually impaired persons will be described by using an example of generating 10 rows*10 columns of protrusion through holes 101, installing the lateral latch 300 in a row unit, installing the longitudinal latch 400 in a column unit, and sequentially controlling the braille block 200 from a first row to a tenth row.

The lateral latch 300 responsible for a first row releases a lock state of the braille blocks 200 of the corresponding row, and the longitudinal latch 400 responsible for columns of the first row releases a lock state of the braille blocks 200 to be protruded in the first row. Subsequently, upper protrusions 210 of the braille blocks 200 to be protruded in the first row are protruded as the lower base 800 is upwardly pushed by operating the lower adjustment unit 900. Subsequently, the lateral latch 300 responsible for the first row locks the braille blocks 200 of the corresponding row such that the protruded upper protrusions 210 are fixed in a protruded state. Subsequently, the lower base 800 moves downwardly to control operation of the following row.

Displaying for the 10 rows*10 columns are completed by repeating the above process for the second row to the tenth row.

As described above, in order to display 10 rows*10 columns, ten lateral latches 300 and ten longitudinal latches 400 are required. Displaying 10 rows*10 columns may be performed by controlling 20 units (motors, etc.) for the lateral latches 300 and the longitudinal latches 400, and one unit (motor, etc.) for the lower adjustment unit 900.

Herein, when a motor is used as the unit, for 20 motors for the lateral latches 300 and the longitudinal latches 400, a motor having an identical output may be used, and a manufacturing cost may be reduces by using a motor with a low output since the influence by the external force is small.

In addition, by installing motors alternately on one side and the other side, for example, installing a motor in the left side for odd-numbered row, and in the right side for even-numbered rows, a limit may be overcome in that the center axis of the lateral latch 300 and the center axis of the longitudinal latch 400 may become close due to space occupied by the motors. In addition, the display module for visually impaired persons according to an embodiment of the present invention may be manufactured in a small size by installing that the center axis of the lateral latch 300 and the center axis of the longitudinal latch 400 to be close.

As shown in FIG. 2, the upper base 500 of the display module for visually impaired persons according to an embodiment of the present invention is formed with an upper base hole 501 with a through hole such that the lower movement shaft portion 610 of the lower block 600 passes therethrough.

The upper base 500 is formed with the upper base hole 501 at a vertical position matching with a position of the protrusion through hole 101 of the display unit 100.

In other words, the upper base hole 501 in formed in the bottom part of the upper base 500 at a position on which the braille block 200 is placed when the braille block 200 falls down by the gravity.

The upper base hole 501 is for pushing the braille block 200 upwardly as a partial upper part of the lower block 600 passes through and protrudes above the upper base hole 501 and upwardly pushes the braille block 200.

As shown in FIG. 2, the lower block 600 and the elastic unit 700 are accommodated inside the lower base 800 of the display module for visually impaired persons according to an embodiment of the present invention, and the lower base 800 is formed with a lower block movement path 801 having a pillar shape to allow the lower block to vertically move, and a lower base hole 802 formed above the lower movement path 801 to communicate with an outside and allowing the lower movement shaft portion 610 to vertically move and to protrude above the lower block movement path 801. Herein, a section where the lower block movement path 801 is formed is configured to be partially divided.

The lower block movement path 801 functions as a cylinder allowing the lower block 600 to vertically move therein, and the lower block 600 is installed in the lower block movement path 801 so as to receive elastic force of the elastic unit 700.

In addition, the lower base hole 802 having an externally opened shape is formed such that the lower block movement path 801 communicate with the outside.

Herein, the lower block movement path 801 and the lower base hole 802 are formed at a vertical position matched with a position of the protrusion through hole 101 of the display unit 100.

This is for pushing the braille block 200 upwardly as the partial upper part of the lower block 600 moves upwardly by passing through and protruding above the lower block movement path 801.

In addition, the lower base 800 may be formed such that a section where the lower block movement path 801 is formed is configured to be partially divided.

This is for easy installation of the lower block 600 and the elastic unit 700 in the lower block movement path 801.

In other words, under a state where the lower base 800 is divided, the lower block 600 and the elastic unit 700 are installed in the lower block movement path 801 by putting the lower block 600 and the elastic unit 700 inside the lower block movement path 801, and then the lower base 800 is assembled.

As shown in FIG. 2, the lower base 800 of the display module for visually impaired persons according to an embodiment of the present invention may include an elastic unit lower fixing portion 810 formed by being protruded or recessed in a vertical direction at a lower part thereof.

The elastic unit lower fixing portion 810 is a configuration for fixing or guiding a lower part of the elastic unit 700. When the elastic unit 700 is formed in a coil spring form having a cylindrical shape, the elastic unit lower fixing portion 810 may be formed in a cylindrical shape having an outer diameter smaller than a diameter of the elastic unit 700 having the coil spring form.

As shown in FIG. 2, the lower adjustment unit 900 of the display module for visually impaired persons according to an embodiment of the present invention is provided with a protrusion portion 910 formed by partially protruding therefrom, and in a structure in that the protrusion portion 910 upwardly pushes the lower base 800 while sliding on a module base 950 provided below the lower adjustment unit 900.

The lower adjustment unit 900 is a configuration for pushing the braille block 200 upwardly as the lower block 600 upwardly pushes the same by being upwardly pushed by the lower base 800.

According to a position of the lower adjustment unit 900, the protrusion portion 910 having a protruded form of the lower adjustment unit 900 may push the lower base 800 upwardly, or the lower base 800 may fall down by the gravity.

In FIG. 2, the lower base 800 falls down by the gravity when the protrusion portion 910 moves to the left end of the lower base 800, and the protrusion portion 910 pushes the lower base 800 upwardly while the protrusion portion 910 moves to the right, but the present invention is not limited thereto. Various implementations are possible as long as the protrusion portion 910 pushes the lower base 800 upwardly according to a position of the lower adjustment unit 900, for example, forming a plurality of protrusion portions 910 in below the lower base 800, and forming a plurality of recessed portions corresponding to the plurality of protrusion portions 910.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A display module for visually impaired persons, the display module comprising:
    a display unit in which a plurality of through holes is arranged in a predetermined array;
    a braille block provided below each through hole and vertically moving whereby an upper protrusion thereof protrudes above the protrusion through hole when the braille block moves upwardly;
    a lateral latch provided below the display unit in a lateral direction, and restricting movement of the braille block in each of laterally arranged protrusion through holes of the display unit and releasing the restriction;
    a longitudinal latch provided below the display unit in a longitudinal direction, and restricting movement of the braille block in each of longitudinally arranged protrusion through holes of the display unit and releasing the restriction;
    an upper base in which the display unit, the braille block, the lateral latch, and the longitudinal latch are installed;
    a lower block provided below each braille block, vertically moving, and pushing the braille block upwardly when the lower block moves upwardly;
    an elastic unit provided below each lower block and providing force to upwardly push the lower block;
    a lower base in which the lower block and the elastic unit are installed; and
    a lower adjustment unit for vertically moving the lower base.

2. The display module of claim 1, wherein the braille block includes:
   an upper movement shaft portion formed by extending from a lower part of the upper protrusion and having a pillar shape;
   an engagement portion formed on the upper movement shaft portion by being protruded or depressed in a horizontal direction; and
   an upper movement stop portion formed on the upper movement shaft portion or formed by extending from a lower part of the upper movement shaft portion, and having a pillar shape with a cross-sectional area greater than a cross-sectional area of the protrusion through hole.

3. The display module of claim 2, wherein the lateral latch is coupled so as to move in a horizontal direction based on the upper movement shaft portion, and formed with a lateral latch slot through which the upper movement shaft portion vertically moves in the lateral latch.

4. The display module of claim 2, wherein the longitudinal latch is coupled so as to move in a horizontal direction based on the upper movement shaft portion, and formed with a longitudinal latch slot through which the upper movement shaft portion vertically moves in the longitudinal latch.

5. The display module of claim 1, wherein the lower block includes:
   a lower movement shaft portion formed in a pillar shape at an upper part thereof; and
   a lower movement stop portion formed on the lower movement shaft portion or formed by extending from a lower part of the lower movement shaft portion, and having a pillar shape with a cross-sectional area greater than a cross-sectional area of the lower movement shaft portion.

6. The display module of claim 5, wherein the lower block further includes an elastic unit upper fixing portion formed by being protruded or recessed in a vertical direction at a lower part thereof.

7. The display module of claim 5, wherein the upper base is formed with an upper base hole through which the lower movement shaft portion of the lower block passes.

8. The display module of claim 5, wherein the lower base is formed with:
   a lower block movement path formed to receive the lower block and the elastic unit therein, and having a pillar shape to allow the lower block to vertically move therethrough; and
   a lower base hole formed above the lower block movement path to communicate with an outside and to allow the lower movement shaft portion to vertically move therethrough,
   wherein a section where the lower block movement path is formed is configured to be partially divided.

9. The display module of claim 8, wherein the lower base further includes an elastic unit lower fixing portion formed by being protruded or recessed in the vertical direction at a lower part thereof.

10. The display module of claim 1, wherein the lower adjustment unit is provided with a protrusion portion formed by partially protruding therefrom, wherein the protrusion portion upwardly pushes the lower base while sliding on a module base provided below the lower adjustment unit.

* * * * *